United States Patent
Waltniel

(10) Patent No.: US 10,223,655 B2
(45) Date of Patent: Mar. 5, 2019

(54) SYSTEMS AND METHODS FOR MANAGING A VEHICLE FLEET

(71) Applicant: TOYOTA MOTOR EUROPE NV/SA, Brussels (BE)

(72) Inventor: Timothy Waltniel, Roosdaal (BE)

(73) Assignee: Toyota Motor Europe NV/SA, Brussels (BE)

(*) Notice: Subject to any disclaimer, the term of this patent is extended or adjusted under 35 U.S.C. 154(b) by 315 days.

(21) Appl. No.: 14/913,848

(22) PCT Filed: Sep. 5, 2013

(86) PCT No.: PCT/EP2013/068405
§ 371 (c)(1),
(2) Date: Feb. 23, 2016

(87) PCT Pub. No.: WO2015/032434
PCT Pub. Date: Mar. 12, 2015

(65) Prior Publication Data
US 2016/0203435 A1 Jul. 14, 2016

(51) Int. Cl.
G06Q 10/00 (2012.01)
G06Q 10/06 (2012.01)
G06Q 30/00 (2012.01)
G06Q 10/08 (2012.01)

(52) U.S. Cl.
CPC ..... *G06Q 10/063118* (2013.01); *G06Q 10/08* (2013.01); *G06Q 30/018* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| 6,636,145 | B1* | 10/2003 | Murakami | G07B 15/00 340/5.42 |
|---|---|---|---|---|
| 8,612,273 | B2* | 12/2013 | Johnson | G06Q 10/02 705/307 |
| 2006/0106635 | A1* | 5/2006 | Ulrich | G06Q 30/0283 705/400 |
| 2008/0040182 | A1* | 2/2008 | Wegner | G06Q 10/04 705/7.26 |
| 2009/0287408 | A1* | 11/2009 | Gerdes | G01C 21/3423 701/533 |

(Continued)

OTHER PUBLICATIONS

Shaheen, Susan A., and Adam P. Cohen. "Carsharing and personal vehicle services: worldwide market developments and emerging trends." International Journal of Sustainable Transportation 7.1 (2013): 5-34.*

(Continued)

*Primary Examiner* — Alan S Miller
(74) *Attorney, Agent, or Firm* — Finnegan, Henderson, Farabow, Garrett & Dunner, LLP

(57) ABSTRACT

A fleet management system for managing a plurality of vehicles is provided. The system includes means for receiving data related to a deposit of a personally owned vehicle from an owner of the vehicle, the deposit being of a predetermined duration, means for receiving a travel request from a traveler other than the owner, and means for assigning the personally owned vehicle for use by the traveler during the predetermined duration based on the travel request.

19 Claims, 4 Drawing Sheets

(56) References Cited

U.S. PATENT DOCUMENTS

| | | | | |
|---|---|---|---|---|
| 2010/0073124 A1* | 3/2010 | Mahalingaiah | ........ | G07C 5/006 340/5.1 |
| 2011/0029358 A1* | 2/2011 | Hyde | ............. | G06Q 30/02 705/14.1 |
| 2011/0099022 A1* | 4/2011 | Stochniol | ............ | G06Q 30/02 705/1.1 |
| 2011/0137691 A1* | 6/2011 | Johnson | ............ | G06Q 10/02 705/5 |
| 2013/0232027 A1* | 9/2013 | Reich | ............ | G06Q 30/0631 705/26.7 |
| 2016/0162927 A1* | 6/2016 | Brandl | ............ | G06Q 30/0231 705/14.31 |

OTHER PUBLICATIONS

Statement in Accordance with the Notice from the European Patent Office dated Oct. 1, 2007 Concerning Business Methods, XP007905525, pp. 592-593 (dated Nov. 2007).

\* cited by examiner

| Owner | Location | Emission Lvl | Function | Availability |
|---|---|---|---|---|
| Smith | HQ | 2 | Delivery | 09h - 18h00 |
| Adams | Satellite 1 | 1 | Commute | 06h - 17h00 |
| | | | | |

SYSTEMS AND METHODS FOR MANAGING A VEHICLE FLEET

CROSS-REFERENCE TO RELATED APPLICATIONS

This application is a national phase application of International Application No. PCT/EP2013/068405, filed Sep. 5, 2013, the content of which is incorporated herein by reference.

FIELD OF THE DISCLOSURE

The present disclosure relates to management of a vehicle fleet, and more particularly to reducing total emissions of a vehicle fleet.

BACKGROUND OF THE DISCLOSURE

As emissions from vehicles have become a significant concern in recent years, regulatory bodies have been implementing stricter policies related to use of vehicles in and around populous areas, as well as areas not as populated. For example, jurisdictions have implemented charges for vehicles present within certain "zones" of a city, these charges being based on emissions levels of the vehicles circulating therein (e.g., $CO_2$, $NO_x$, particulate, etc.) The greater the emissions levels, the higher the charge for a vehicle present within the zone. Likewise, vehicles emitting the lowest levels of pollutants can be subject to reduced charges or even exempted from paying any charges at all.

In order to improve the environment and to address such policies, new technologies are being continuously developed to reduce vehicle emissions. However, such technology can be costly to develop and implement on a large scale, and this cost is ultimately transferred to a purchaser or lessee of a vehicle in the form of elevated costs and less favorable leasing terms to obtain vehicles having the newly developed technology. This elevated cost can ultimately discourage many consumers from obtaining vehicles having newer technologies that have the capability to improve the environment by way of reduced vehicle emissions.

In addition to emissions concerns, the overabundance of vehicles in and around populous areas can result in congestion of motorways, parking problems, and general unpleasantness for residents of the populous areas, among others. Therefore, regulatory bodies have also implemented policies to attempt to limit the number of vehicles in and around the populous areas. For example, allocated parking spots for a new construction building may be limited to one vehicle spot for every four occupants of the building. Alternatively, or in addition, jurisdictions may charge a fee for each car present within the jurisdiction each day.

For corporations having a need for fleet vehicles to enable their employees to travel for business related tasks, such charges can be exponentially large. Further, where regulations, corporate responsibility, or other factors require corporate fleets to meet certain emissions standards, the corporation may be forced to invest heavily to replace its existing fleet of corporate vehicles to reduce emissions and charges associated with its fleet.

JP 2009-217759 describes a system in which a vehicle is used for both business and personal travel. During operation of the vehicle for business purposes, a selecting means is operated to place the vehicle in business mode for purposes of recording the business travel. Likewise, the selecting means is operated to place the vehicle in personal mode for purposes of recording personal travel.

US 2011/0301997 describes a system wherein trip plans for a plurality of employees are logged and compared to determine where rides may be shared among the plurality of employees. Business travel is then coordinated such that redundancy in trips along similar corridors and destinations may be eliminated using either a corporate or personal vehicle. This document teaches that financial incentives are to be avoided and softer incentives should be provided to encourage participation.

In view of the above there remains a need to reduce a company's total emissions footprint associated with a corporate fleet. In addition, there remains a need to reduce the number of vehicles owned directly by the corporation and to reduce the number of vehicles continuously located within the limits of populous corporate areas.

It is accordingly a primary object of the disclosure to provide systems and methods for overcoming one or more of the above-stated problems.

SUMMARY OF THE DISCLOSURE

According to embodiments of the present invention, A fleet management system for managing a plurality of vehicles is provided. The system includes means for receiving data related to a deposit of a personally owned vehicle from an owner of the vehicle, the deposit being of a predetermined duration, means for receiving a travel request from a traveler other than the owner, and means for assigning the personally owned vehicle for use by the traveler during the predetermined duration based on the travel request.

The travel request may include at least a destination or a distance of travel. Additionally, the travel request may specify a reason for travel.

In addition, means for determining an emissions profile associated with the plurality of vehicles of the fleet and means for determining a compensation scheme for the owner of the vehicle may also be provided.

For purposes of this disclosure, the term "personally owned" shall refer to any legal construct whereby a natural person or collection of natural persons holds sufficiently all rights and responsibilities of ownership including, but not limited to utilization, storage, and maintenance. For example, at least purchasing and leasing of a vehicle are intended to fall under this definition.

Importantly, by providing such a system, a corporation or other entity may mitigate its emissions footprint (e.g., carbon, $NO_x$, etc.) by facilitating the ownership of vehicles possessing the latest emissions reduction technologies by employees of the corporation, and by assigning vehicles that are best suited to performing functions associated with the requested travel plan. In addition, the corporation or other entity may reduce or completely eliminate the need for vehicles owned, maintained, and garaged by the corporation, thereby mitigating charges associated with performing these types of functions related to such vehicles (e.g., congestion fees, parking fees, etc).

According to some embodiments, a method for managing a vehicle fleet is provided. The method includes receiving a deposit from an owner of at least one personally owned vehicle for use in the vehicle fleet, the deposit being of a predetermined duration, receiving from a traveler other than the owner, a travel request, and assigning the personally owned vehicle for use by the traveler during at least a portion of the predetermined duration based on the travel request.

The travel request may indicate at least a destination or a distance of travel, and may further specify a reason for travel.

According to some embodiments, the method further includes assigning each vehicle of the vehicle fleet an emission classification based on at least one of vehicle capacity, efficiency, and exhaust emission profile, particularly carbon (e.g., $CO_2$) and NOx emissions. Each vehicle of the vehicle fleet may also be assigned a function classification based on a primary function associated with the at least one personally owned vehicle (e.g., cargo carrier, people mover, etc).

Storing and indexing the emission classification and the function classification associated with the at least one personally owned vehicle may be performed, and the assignment can be further based on at least one of the emission classification and the function classification.

The owner may be compensated for depositing the at least one personally owned vehicle, and such compensation may be in whole or in part formed by discounted purchase or lease terms for acquisition of the at least one personally owned vehicle. Compensation may also take the form of time based payments (e.g., monthly), maintenance payments, etc.

The owner can be compensated based on at least one of vehicle efficiency, exhaust emission levels, and predetermined duration, and the compensation can be inversely proportional to the exhaust emission levels and/or directly proportional to the vehicle efficiency.

The traveler may be required to deposit a personally owned vehicle for use in the vehicle fleet as a condition of using a vehicle fleet vehicle.

According to some embodiments, the assignment can be made taking into account a vehicle efficiency and a vehicle emissions profile in view of the reason for travel. In addition, the personally owned vehicle can be fractionally owned by two or more individuals. Each of the two or more individuals can be compensated according to their share of the fractional ownership. Alternatively, no compensation may be provided to the owner. The owner may be compensated by way of public programs seeking to enhance usage of emissions reducing equipment.

According to some embodiments, carbon emissions associated with the vehicle fleet resulting in credits may be tracked, stored, traded, and used based on excess emissions capacity provided by the vehicle fleet.

The reason for travel can be business related and/or personal.

According to still other embodiments of the invention, a computer implemented system for managing a vehicle fleet is provided. The system includes a deposit module for storing a record of a deposit from an owner of at least one personally owned vehicle for use in the vehicle fleet, the deposit being of a predetermined duration, a request module configured to receive and process a travel request from a traveler other than the owner, and a determination module configured to determine and assign a personally owned vehicle from the vehicle fleet for use by the traveler during at least a portion of the predetermined duration based on the travel request.

The system may also include a classification module configured to assign each vehicle of the vehicle fleet an emission classification based on at least one of vehicle capacity, efficiency, and exhaust emission level, particularly carbon (e.g., $CO_2$) and NOx emissions, and to store and index the assigned classification.

A tracking module configured to track carbon emissions associated with the vehicle fleet resulting in credits may be provided with the system, and the system may be configured for coordination among a plurality of vehicle fleets. Such coordination may be of limited geographical region.

According to some embodiments, employees owning the most fuel efficient and/or lowest emission level vehicles are given priority to participate in the program.

The travel request may indicate at least a destination or a distance of travel, and may further include a reason for travel.

According to some embodiments, predictive systems implemented by various jurisdictions for predicting, for example, traffic congestion, emissions, and parking availability may provide information to the system. Such information may be used for vehicle assignment determinations.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Many corporations provide parking facilities to employees to enable employees to drive their vehicles to and from work on a daily basis. Depending on, for example, the location of the provided parking, there may be a limited number of available parking spots for vehicles owned by employees and those owned by the corporation. However, using systems and methods of the present invention, the same cars that are driven to work and parked by the employees form the corporate fleet during the key business travel hours of the day.

A corporation or other similar entity (e.g., a partnership, a small business, etc.), hereafter "the corporation," having a pool or fleet of cars available for employees to use for travel during work hours may choose to modify such a system such that instead of the corporation owning the vehicles in the fleet, such fleet is comprised of employee owned vehicles made available for corporate use over a predetermined duration (e.g., working hours).

According to embodiments of the present disclosure, employees of the corporation may be provided with various incentives for participating in the program and may further be incentivized to purchase certain vehicles.

Therefore, the corporation may elect to implement a fleet management system consistent with embodiments of the present invention. The corporation may solicit employees to join the program and may, depending on the configuration of the system, accept any and all employees who wish to join, or may select only those employees having vehicles meeting certain criteria, for example, bringing new technology to the corporate vehicle fleet.

Figure 1:
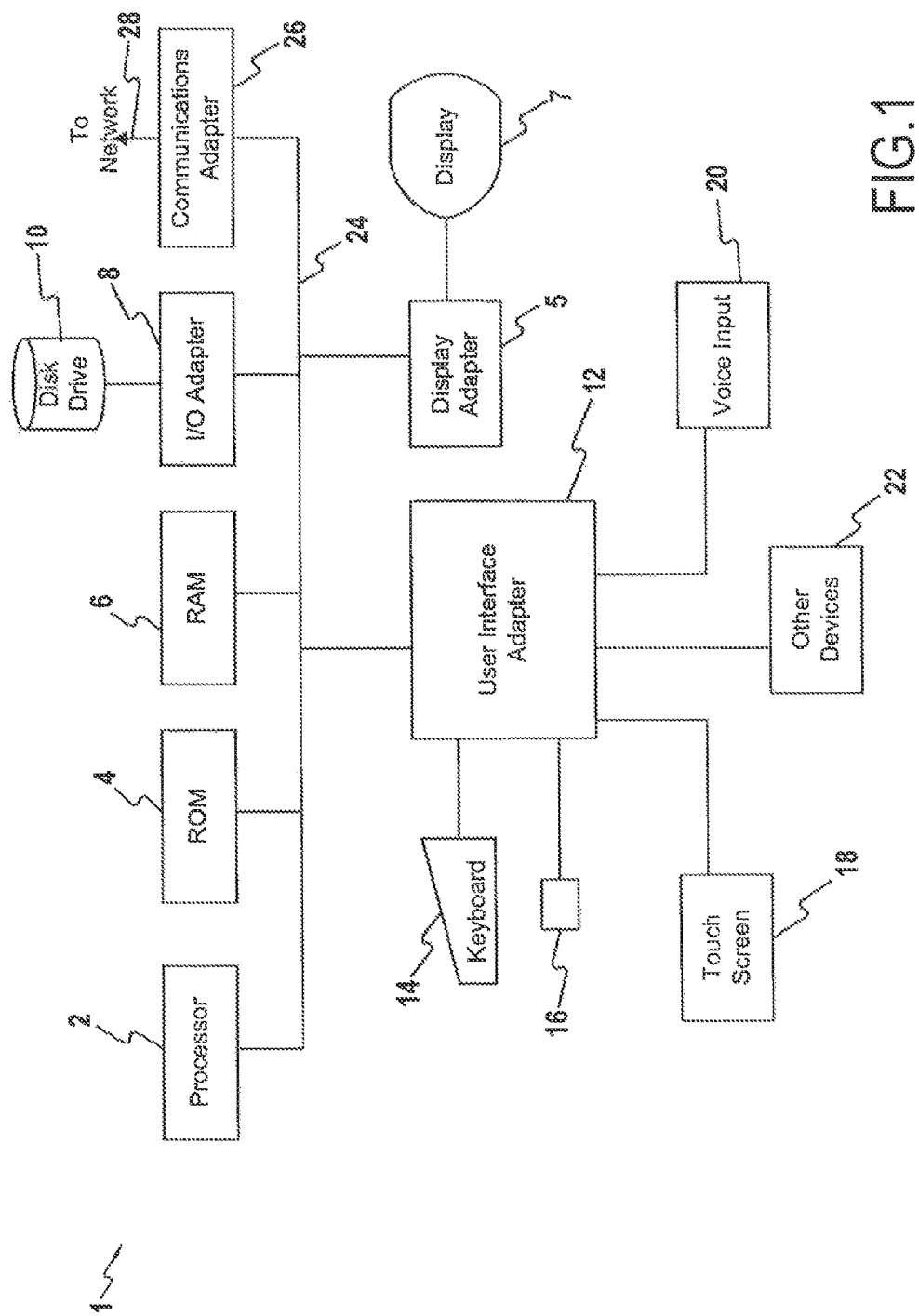
FIG. 1 is a block diagram of a host computer system capable of implementing the methods and systems disclosed.

FIG. 1 is a block diagram of a host computer system 1 capable of implementing the methods and systems disclosed. Host computer system 1 may include a group of computer programs, program modules, and computer readable data stored on a computer readable medium operating to cause computer system 1 to perform the actions described herein.

Host computer system 1 may include a desktop or portable computer, a workstation, a server, a personal digital assistant, a smartphone, or any other computer system. Host computer system 1 may include a processor 2, a read-only memory (ROM) 4, a random access memory (RAM) 6, an input/output (I/O) adapter 8 for connecting peripheral devices such as disk drives 10, a user interface adapter 12 for connecting input devices such as a keyboard 14, a mouse 16, a touch screen 18, a voice input 20 and/or other devices 22 to a system bus 24. A communications adapter 26 may connect host computer system 1 to a network 28, and a display adapter 5 may connect system bus 24 to a display 7.

In an exemplary embodiment, the disclosed methods and systems may be implemented as a computer program running on a computer. Furthermore, the methods and systems disclosed herein may be implemented using numerous operating environments such as, but not limited to, DOS, Linux, Windows, VMS, VAX, BeOS, Solaris, OS/2, Macintosh, UNIX, and any future operating systems currently existing or developed in the future.

Processor 2 may execute instructions associated with a fleet management system which may be stored on disk drive 10, in RAM 6, or any other suitable location (e.g., a network location). The fleet management system may receive input parameters related to employee vehicles, travel requests, vehicle parameters and other information associated with the system. The fleet management system may then analyze the input parameters to determine characteristics and functions of the vehicles currently in the fleet for comparison with particular travel requests received. A vehicle may then be assigned to a traveler based on the travel request, the available vehicles, the vehicle characteristics corresponding to an emission classification, a vehicle function classification, etc.

Figures 2, 3:
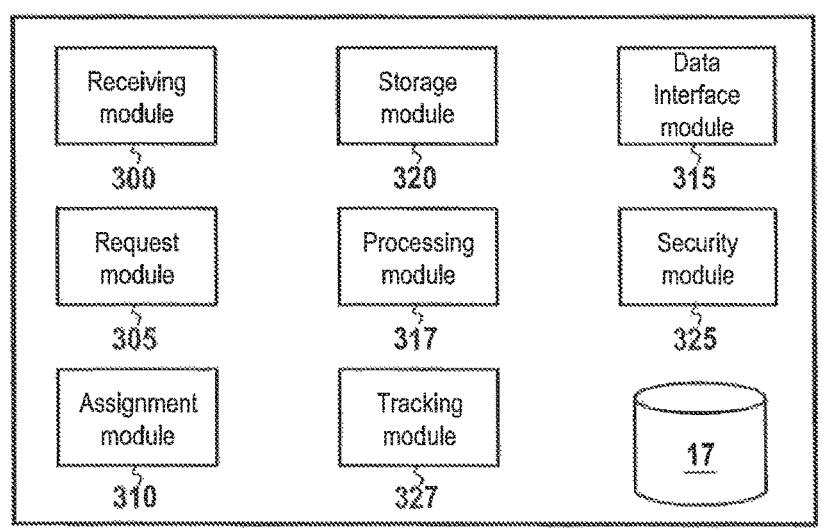
FIG. 2 is an exemplary block diagram showing a logical structure of computer modules configured to carry out functions of the present disclosure.
FIG. 3 is an exemplary data table that may be implemented within a database for purposes of storing data related to the present disclosure.

FIG. 2 is an exemplary block diagram showing a logical structure of computer modules configured to carry out functions of the present disclosure. One or more of the software modules may be developed for carrying out various tasks associated with the methods described herein. For example, such modules may be developed using object oriented and/or other development techniques, and using Java, C, C++, BASIC, and/or any suitable programming language. One of skill in the art will recognize that many programming languages exist and likely more will be developed in the future. Therefore, the scope of the present disclosure is not intended to be limiting to any one programming language mentioned herein.

Further, each of the modules may be configured for interfacing with one or more databases 17 configured to store, organize, and retrieve data. In some embodiments, such databases may be implemented using Microsoft SQL Server, Oracle, MySQL, flat file systems, or any other suitable data repository. The one or more databases may contain tables consisting of columns and rows, for example, a high level table 500 representing a data structure similar to that described with regard to the database is shown at FIG. 3. Notably, one or more databases may be implemented for purposes of storing data related to the present system and methods.

One of ordinary skill in the art will recognize that various database designs may be implemented for purposes of carrying out the disclosed methods and the table of FIG. 3 is exemplary only. All such designs are intended to fall within the scope of the present disclosure.

Returning to FIG. 2, such modules may include a receiving module 300, a request module 305, an assignment module 310, a processing module 317, a storage module 320, a data interface module 315, a security module 325, a tracking module 327, and other suitable modules.

Receiving module 300 may be configured for receiving data related deposits of vehicles, owners of vehicles, vehicle characteristics, etc. For example, receiving module 300 may be configured to communicate with data interface module 315 to receive, update, and store vehicle characteristics following entry of a new vehicle into the fleet management system. Such information may then be processed by processing module 317 such that the vehicle function and vehicle emissions profile information may be updated for a particular owner.

Request module 305 may be configured to communicate with data interface module 315 and/or receiving module 300, for example, to receive data related to a travel request from a traveler which has been stored in database 17 and/or communicated to request module 305. Such a travel request may specify, for example, a destination, a distance to be travelled, a reason for travel, a departure time, and an estimated return time, among other things. Such a request may be made at a remote computer via a network connection, for example a kiosk on company grounds or may be made locally at host computer system 1. One of skill in the art will recognize that, in view of the plethora of communication methods available, a travel request may be made from any number of locations and devices (e.g., a smartphone from a remote location).

Assignment module 310 may be configured to analyze a travel request to determine a fleet vehicle for assignment to a traveler. Assignment module 310 may therefore be configured to interface with data interface module 315 to obtain a list of available vehicles and use such data in combination with a travel request to select an appropriate vehicle from the fleet to assign to a traveler.

Assignment module 310 may be configured to communicate with systems such as predictive systems implemented by various jurisdictions. Such systems may be configured to predict, for example, traffic congestion, emissions, and parking availability, among others, and may provide information to requesting entities (e.g., via the Internet or other network). This information may be used by assignment module 310 or other appropriate module for vehicle assignment determinations.

For example, where a predictive system indicates that pollution on a particular day in a particular jurisdiction may be above a certain limit, the system may indicate that only emission free vehicles will be permitted to enter the jurisdiction on such day. Therefore, assignment module 310 may undertake to assign an emission free vehicle for travelers travelling to such jurisdiction on the specified day.

Once a vehicle has been assigned, assignment module 310 may update database 17 via data interface module 315 to indicate the assigned vehicle as no longer available.

Data interface module 315 may be configured to provide one or more interfaces for receiving information from a source. For example, data interface module 315 (or another module) may include listeners, graphical user interface (GUI) forms and screens, sockets, etc., suitable for receiving information. In such an example, data interface module 315 may be configured to output a GUI form for purposes of manual data entry, e.g. related to characteristics of a vehicle, a travel request, etc. Further, a listener and/or socket may enable data interface module to receive information from remotely stationed computers via, for example, a network such as the Internet. Such connections to sockets/listeners may be secured using a variety of data encryption techniques. One of ordinary skill in the art will recognize that the methods of the present disclosure may further be carried out in a distributed computer network environment, and may be enabled over a wide area network. Therefore, security may be implemented as desired using any suitable technique (e.g., Advanced Encryption Standard (AES), Data Encryption Standard (DES), etc.) and security level (e.g., 128-bit, 40-bit, etc.) Security module 325 may therefore, be configured for receiving information and encrypting/decrypting such information. Security module 325 may then provide the encrypted/decrypted data to the appropriate module.

Tracking module 327 may be configured to track emissions and travel data associated with vehicles of the fleet. For example, tracking module 327 may receiving information from receiving module 300, which may in turn be configured to interface with a vehicles computer system, e.g., via OBD-II or other similar interface and protocol. Tracking module may determine actual emissions data of the vehicle and store such data to database 17 via data interface module 315. Tracking module 327 may also be configured to process a collection of data among the fleet to determine whether emissions credits may be obtained, where applicable, and store such information to database 17.

Figure 4:
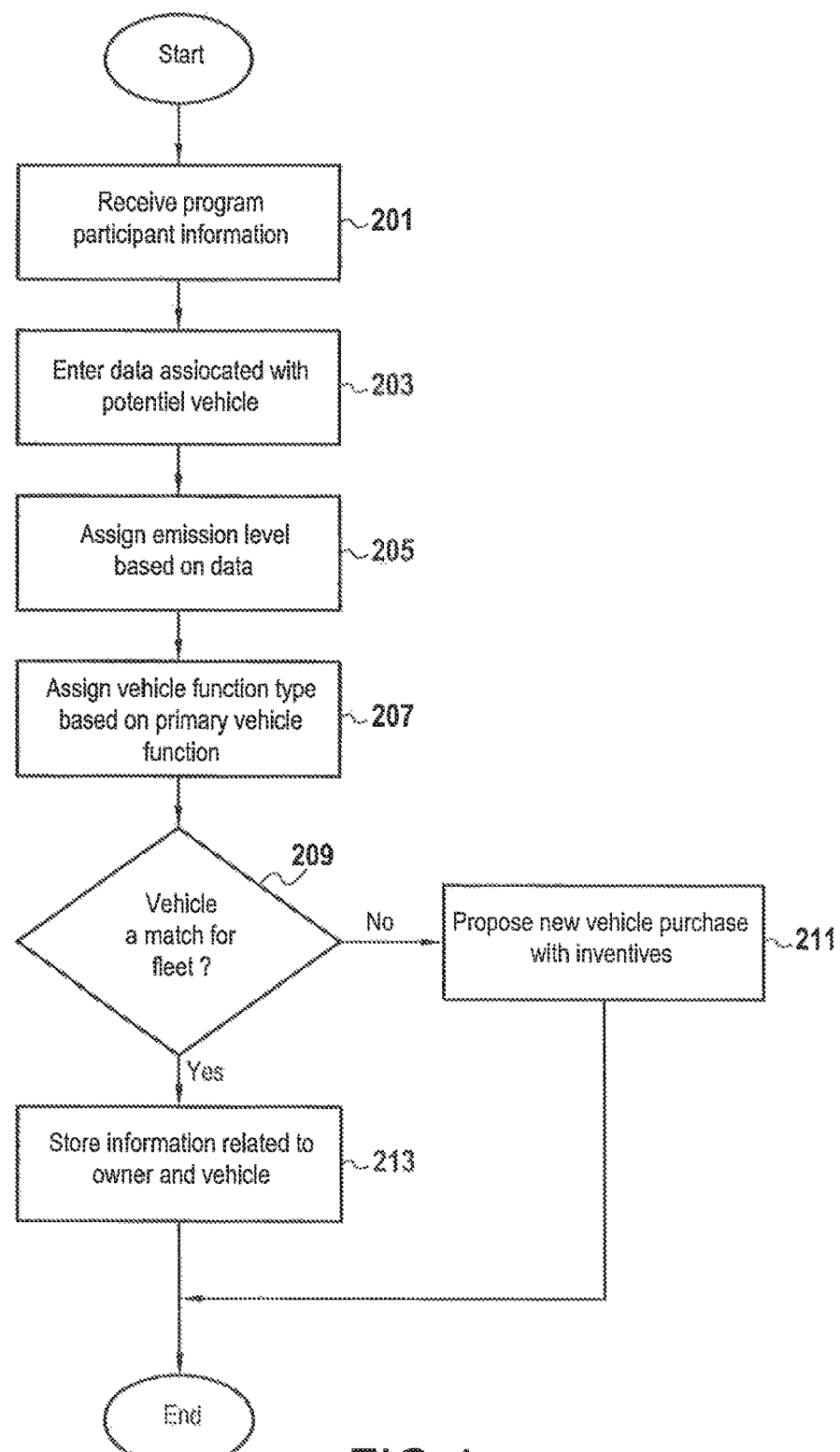
FIG. 4 is a flowchart depicting an exemplary method for carrying out embodiments of the present disclosure.

FIG. 4 is a flowchart 200 depicting an exemplary method for carrying out embodiments of the present disclosure. Once the corporation has begun implementation of a fleet management program according to the present disclosure, a solicitation may be made for participants in the program. For example, the corporation may send out a company-wide e-mail indicating the desire to have employees participate in the program by depositing their vehicle for use in the corporate fleet during, e.g., work hours, and specifying additional information regarding such participation. For example, the corporation may require that employees parking their cars on corporate property participate in the fleet management program as compensation for providing the parking to employees.

Employees that agree to participate may then provide information related to their participation to the corporation (step 201). For example, the corporation may receive information such as the employees name and contact information, characteristics of the vehicle personally owned by the employee (e.g., year, make, model, trim level, etc.) and the typical working hours of the employee, in other words a predetermined duration when the vehicle can be expected to be available in the fleet of vehicles.

Additional information may also be provided for participation in the program, such as, for example, a work/parking location, an employee ID number, a vehicle preference, etc. One of ordinary skill in the art will recognize that data provided by participants may be more or less detailed without departing from the scope of the present disclosure.

Importantly, based on the information related to the owner and the vehicle, the system may be configured to retrieve additional data, e.g., via communications adapter 26 over network 28 (e.g., with a server over the Internet), in order to obtain additional details regarding the specified vehicle and/or owner. For example, where a year, make, and model of vehicle has been provided, and various trim levels associated with such a vehicle, a selection prompt may be provided to the user entering the data such that the user may select the trim level of the vehicle from a known collection of trim level options. The data for the selection may come from database 10 and/or via communications adapter 26, among others (e.g., disk 10). In addition, other data may be obtained, for example, engine size, emission statistics, vehicle efficiency, capacity, primary function, etc. Moreover, driving record and history of a vehicle owner may also be obtained as desired (e.g., accidents, legal infractions, etc.) One of skill will recognize that various other data may be collected during a registration process such as that described. Such data collection is intended to fall within the scope of the present disclosure.

Once this information has been received, the information may be entered and stored (step 203), for example in the database system 17 associated with host computer system 1 (e.g., on disk 10).

Following or during the entry of information related a vehicle personally owned by the owner/employee, processing module 317 may process the incoming data for purposes of determining, for example, an emissions profile of the vehicle, a function of the vehicle, and other characteristics that may be desirable to obtain and related to a fleet management system. In some is instances, processing module 317 may communicate with, for example, data interface module 315, storage module 320, and receiving module 300, in addition to communications adapter 26 for purposes of obtaining information over the network 28 and/or from database 17.

Such data retrieval may be of particular interest with newer model vehicles whose various technical information is available for download from manufacturers websites or other storage locations. For example, detailed emissions profiles and fuel efficiency data can be downloaded for numerous vehicles and used for determining characteristics of the vehicle during travel. Further, the fleet management system may be able to interface via a particular module (e.g., tracking module 327) with interfaces provided on each vehicle (e.g., OBD-II), such interfaces providing real-time and/or stored data related to operation of the vehicle. According to some embodiments of the present disclosure this information stored and/or obtained real time may be processed and used for determining characteristics of a particular vehicle in the fleet. Such information may be provided via a wired connection (LAN, OBD-II, etc.) or a wireless connection (e.g., WiFi, 3G/4G, etc.)

By obtaining such information it may be possible to more accurately determine an emissions profile with regard to particular components, e.g. carbon dioxide, carbon monoxide, nitrogen oxides, hydrocarbons, particulate, and other pollutants. Moreover, it may be possible to more accurately determine fuel usage of a vehicle and driving habits of a traveler using a particular vehicle.

The above information, regardless of how obtained, may then be used for determining an emission level associated with the personally owned vehicle (step 205). According to some embodiments, a first value for an emissions level may be specified indicating, at a high level, a general amount of emissions from a particular vehicle. In addition to this first value several second values may be determined indicating specific emission levels for one or more of the particular components/pollutants mentioned above with all values being stored, for example, in database 17. Alternatively, as desired only one set of values or a single value may be determined and stored in database 17 for classifying a vehicles emissions profile.

In addition to determining the above noted information, processing module 317 may also be configured to determine a vehicle function type based on, for example, a primary vehicle function in the function type stored in database 17 (step 207). The vehicle function type may reflect a function that said vehicle is best suited for carrying out. For example a small high-efficiency hybrid vehicle may be best suited for city commuting (e.g., local sales calls). In another example in large people mover may be configured for longer haul commuting, for example to a distant location for attendance of a technical conference with a number of travelers from this corporation attending. In yet another example, a pickup truck may have a primary function of hauling large items over short to medium distances, One of skill in the art will recognize that vehicle function type may have both subjective and objective components, and determination therefore may be particular to an implementing corporation. The function types discussed herein are not intended to be limiting and are exemplary only.

According to some embodiments, following the input of information related to a personally owned vehicle, processing module 317, and/or other suitable modules may communicate to process and determine whether a vehicle is a match for the vehicle fleet (step 209). For example, where the present vehicle being considered is a pickup truck, and processing module 317 determines that there are already a sufficient number of pickup trucks in the fleet (step 209: no) the system may deny entry of the vehicle into the fleet, and may propose a new vehicle for purchase, lease, or other ownership method to the employee/owner (step 211). In making such proposal, processing module 317 may, for example, determine where certain vehicle types and/or vehicles having certain emission levels are lacking in the fleet, and propose a number of selections for obtaining by the owner/employee.

In addition to the above, the present vehicle being considered may be prohibited from participating in the fleet based on its emission level, efficiency, size, drivability, safety record, or other factors. For example, where the present vehicle is based on obsolete technology and may adversely impact the carbon footprint of the corporation, the vehicle may be prohibited from being used in the corporate fleet. In another example, where fuel efficiency is inadequate, (e.g., the vehicle falls into the category of "gas guzzler"), such vehicles may also be prohibited from being used in the corporate fleet. One of ordinary skill will recognize that numerous factors may be put in place by a corporation for determining whether or not a vehicle may be used in the vehicle fleet. The examples provided herein are not intended to be limiting.

In conjunction with obtaining such vehicle as the owner/employee may choose, certain incentives may be offered by the corporation. Such incentives may be provided in whole or in part by the corporation and/or a car manufacturer. For example, the corporation may have a particular agreement with Toyota enabling employees of the corporation to purchase Toyota manufactured vehicles at a discount, among other incentives (reduced lease fees, 0% down, 0% financing, etc.) in proposing a vehicle for collection of vehicles to choose from at step 211, such incentives may be reflected when information is presented to the employee/owner.

In return for making a vehicle available for use in the corporate fleet, the employee may also receive a monetary and/or other suitable incentive (e.g., a recurring payment). Such incentives may be based on actual corporate use of the employees personally owned vehicle by other travelers, may be time based (e.g., predetermined duration), and/or otherwise suitably configured. For example, an employee agreeing to allow use of the car for 10 hours per work day may receive a monthly stipend of 250 euros, while an employee agreeing to allow use of the car for 8 hours per work day may receive only 200 euros. In another example, an employee may receive a monthly payment of a fixed amount based on the value of the vehicle obtained.

Alternatively, an exemplary incentive scheme based on actual use may reward an employee 50 cents per kilometer for which the vehicle has been used by the corporation, or may be awarded 25 euro for each use of the vehicle. Any such incentives may be over and above incentives offered to employees for obtaining new technology vehicles.

One of skill in the art will recognize that various incentive schemes can be implemented without departing from the scope of the present disclosure. In addition, one of skill will recognize that various schemes related to maintenance and upkeep of the personally owned vehicles can also be implemented (e.g., shared maintenance, owner paid maintenance, corporate paid maintenance).

Where processing module, or other suitable module, determines that the present vehicle is a good match for the fleet (step 209: yes), the information related to the owner vehicle may be stored in database 17 (step 213) thereby making the personally owned vehicle available for use by travelers within the corporation.

Figure 5:
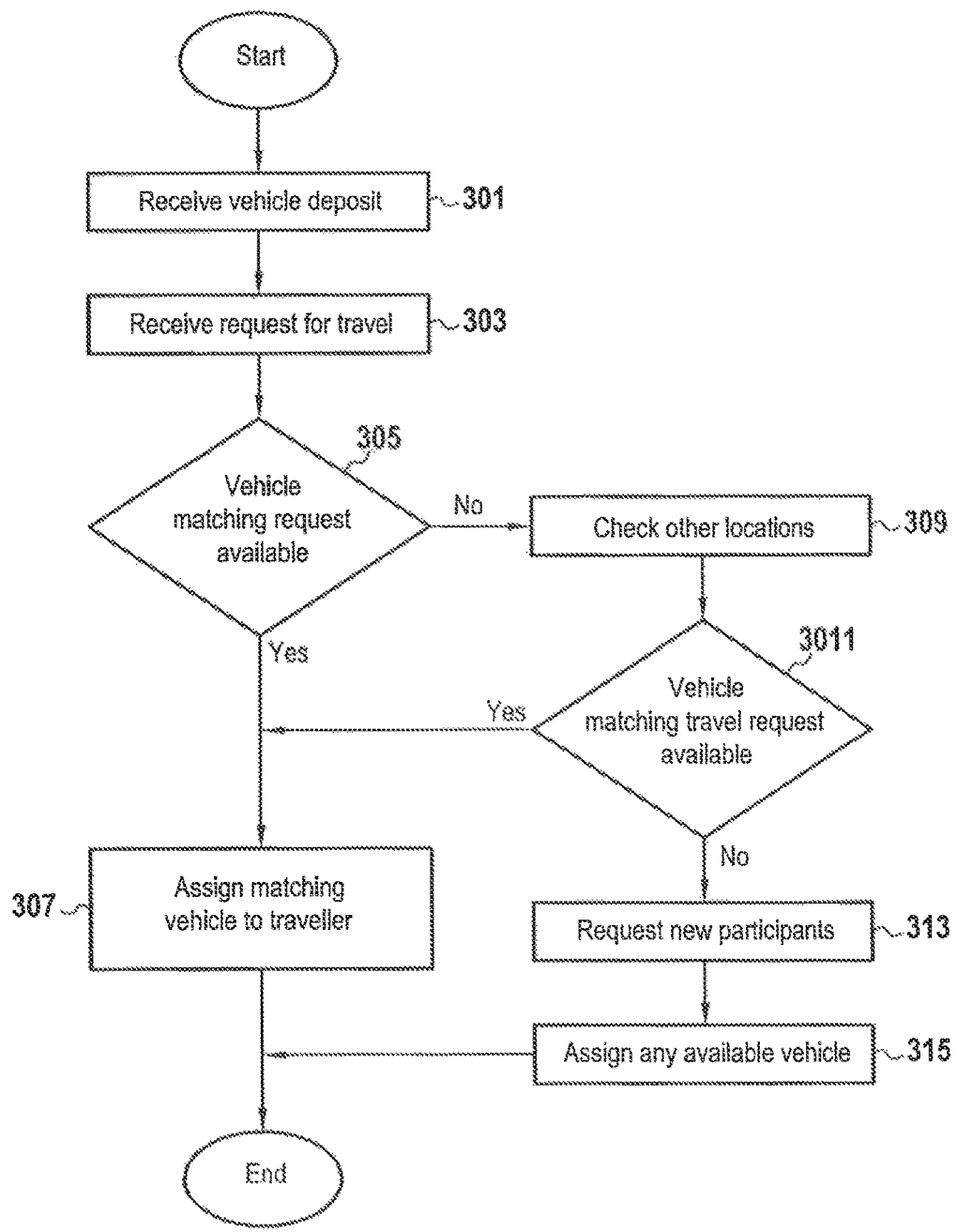
FIG. 5 is a flowchart depicting another exemplary method associated with the present disclosure.

FIG. 5 is a flowchart depicting another exemplary method associated with the present disclosure. Once a plurality of personally owned vehicles have been entered into the fleet system for use by the corporation, an employee arriving at work in a vehicle may deposit the vehicle for use in the vehicle fleet (step 301). Depending on how such a check-in/deposit process is implemented, the process may remain unchanged from an employee's previous routine of driving to work, parking, and leaving the vehicle to go inside the building to begin the workday.

For example, a check-in/deposit process may involve use of a badge, smart card, barcode, or other suitable identification devices (e.g., license plate recognition device) to identify the vehicle being checked in/deposited. Where a scanned device is used, e.g., badge, smart card, barcode, scanning may take place before the vehicle is permitted entry to a parking or staging area. Of course such check-in may take place automatically any employee need not perform any operation in order to enter the parking or staging area.

Once the vehicle has been noted as having entered the parking or staging area, receiving module 300 may be alerted as to the deposit of the vehicle and the appropriate updates made to database 17, particularly the vehicle made available for use by a traveler during the predetermined duration.

At some point during the predetermined duration, request module 305 may receive one or more requests for travel (step 303). Such requests may specify, for example, a destination, a distance to be travelled, a reason for travel, a departure time, and an estimated return time, among other things.

Alternatively or in addition, processing module may specify a return time taking into account the reason for travel, the destination, the distance, and historical traffic data for various travel routes to and from the destination. Such historical data may be obtained from communication adapter 26 via a connection to providers of such data from the internet for example.

For example, a travel request may specify a reason for travel being a conference with a destination at a remote corporate facility departing at 10 AM. In another example a reason for travel may be to transport one or more orders from corporate headquarters to one or more client locations leaving at 1 PM. In yet another example, a reason for travel may be a sales call with a destination having the same postal code as corporate headquarters leaving at 8 AM. One of ordinary skill in the art will recognize that any number of reasons for travel to destinations far and near are possible, and are intended to fall within the scope of the present disclosure.

After processing module 317 has performed appropriate calculations associated with the travel request, processing module 317 may communicate with data interface module 315, assignment module 310, storage module 320, and other suitable modules for determining whether a matching vehicle exists in the fleet (step 305). For example if a travel request is made specifying a reason for travel to attend the conference having a destination within several miles of the location of the employee, processing module 317 and/or request module 305 may search the fleet inventory for a small city type vehicle having ultra-low or zero emissions such as an electric (e.g., Toyota iQ) or hybrid (e.g., Toyota Prius) vehicle. In another example, where a request includes several employees for travel to a remote corporate location, processing module 317 and/or request module 305 may search the fleet inventory for a larger people mover having a slightly higher emissions classification (e.g., Toyota Verso) to provide desirable efficiency and emission characteristics while still carrying out the desired function. One of ordinary skill will understand that the presently described scenarios are exemplary only and numerous scenarios may be possible based on travel requests.

If the system is unable to identify a vehicle in the fleet matching the travel request, for example insufficient time for travel based on the predetermined duration, incorrectly sized vehicles or vehicles having undesirable emission characteristics, (step 305: no) the system may search, if available, other locations for another suitable vehicle (step 309). If upon searching other locations system is again unable to find a suitable vehicle for the travel request (step 311: no) the system may undertake to request new participants in the program (313) specifying particular increased incentives for obtaining vehicles of the type currently sought, for example, and may then undertake a search for the next best available vehicle at any of the locations (step 315), particularly favoring the present location.

Once a suitable vehicle has been identified, i.e. a vehicle having a suitable function, emissions profile, and available duration, this vehicle may be assigned by assignment module 310 to the traveler for use from the fleet (step 307). Assignment module 310 may communicate with data interface module 315 and/or storage module 320 to affect the proper modifications in database 17 such that the assigned vehicle becomes unavailable for the duration of use by the currently assigned traveler.

Importantly one of skill in the art will note by implementing a fleet management system wherein the investment is undertaken by the employees and desirable vehicles (e.g., those having the latest technology related to emissions and fuel economy) are encouraged and/or permitted entry to the program, the corporation may control costs related to such a fleet as well as the emissions footprint of the corporation.

In addition, according to some embodiments, tracking module 327 may be implemented to monitor emissions of the corporate fleet through the real-time and stored vehicle data available from a vehicle interface described earlier. Such emissions data may give rise to the availability of certain emissions rights (e.g., carbon credits or other tradable certificates related to emissions rights) such that the corporation may either use these certificates for their own benefit (e.g., additional emissions elsewhere) or sell the rights to others needing additional emissions rights.

Although the present disclosure herein has been described with reference to particular embodiments, it is to be understood that these embodiments are merely illustrative of the principles and applications of the present disclosure.

For example, the systems and methods described herein may be implemented to create a broader vehicle sharing system based on fractional vehicle ownership. In such a system members and/or employees may invest in vehicles such that a fleet comprising a plurality of vehicles having different primary functions is created. Such a fleet may comprise several utility vehicles, several commuter vehicles, several vacation vehicles, etc.

The members and/or employees involved with such a program may then, based on their needs at any given time, "borrow" a vehicle from the fleet. For example, a member and/or employee traveling on a family vacation for a weekend may reserve and borrow one of the vacation vehicles. Another member and/or employee undertaking a move between different residences may reserve and borrow a pickup truck to assist with moving furniture.

In such a system, each of the "personally" owned vehicles may have 2 or more fractional owners who have invested money and/or other consideration to become a member or may be an employee of the corporation into which the vehicle has been deposited for fleet use.

By allowing a fleet or collection of fleets to be managed in this way, it can stimulate the investment required by a plurality of joint owners, while reducing wasted resources. Investment funds can then be put to optimal use through obtaining vehicles having the latest emissions reducing and fuel saving technologies.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

The invention claimed is:

1. A fleet management system for managing a plurality of vehicles, the system comprising:
   a processor configured to execute instructions associated with the fleet management system;
   a receiving module configured to receive data related to a deposit of a personally owned vehicle from an owner of the vehicle, the deposit being of a predetermined duration, and to provide the data to the processor;
   a request module configured to receive a travel request from a traveler other than the owner, and to provide the travel request to the processor;
   a classification module, executed by the processor, configured to assign each vehicle of the vehicle fleet an emission classification based on at least one of vehicle capacity, vehicle efficiency, and emissions profile, particularly carbon and NOx emissions;
   a tracking module, implemented by the processor, configured to track actual, real-time vehicle emissions and fuel-efficiency data, and emissions credits obtained by the vehicle fleet based on excess emissions capacity provided by the vehicle fleet;
   a storage device for storing and indexing the emission classification associated with the at least one personally owned vehicle,
   and
   an assignment module, implemented by the processor, configured to assign the personally owned vehicle for use by the traveler during the predetermined duration based on the travel request, the actual, real-time vehicle emissions and fuel-efficiency data, the emissions credits obtained by the vehicle fleet, and at least the emission classification of the personally owned vehicle to mitigate an emissions footprint of the fleet to maximize the emissions credits obtained by the vehicle fleet.

2. The fleet management system according to the previous claim, wherein the travel request includes at least a destination or a distance of travel.

3. The fleet management system according to claim 1 wherein the travel request includes at least a reason for travel.

4. The fleet management system according to claim 1, further comprising an emissions evaluator configured to determine an emissions level associated with the plurality of vehicles of the fleet.

5. The fleet management system according to claim 1, further comprising a compensation evaluator configured to determine a compensation scheme for the owner of the vehicle.

6. A computer-implemented method for managing a vehicle fleet, the method comprising:
   receiving, by the computer, a deposit from an owner of at least one personally owned vehicle for use in the vehicle fleet, the deposit being of a predetermined duration;
   assigning, by the computer, each vehicle of the vehicle fleet an emission classification based on at least one of vehicle capacity, vehicle efficiency, and emissions profile, particularly carbon and NOx emissions;
   storing and indexing, by the computer, the emission classification associated with the at least one personally owned vehicle;
   tracking actual, real-time vehicle emissions and fuel-efficiency data, and emissions credits obtained by the vehicle fleet based on excess emissions capacity provided by the vehicle fleet
   receiving, by the computer a travel request from a traveler other than the owner; and
   assigning, by the computer, the personally owned vehicle for use by the traveler during at least a portion of the predetermined duration based on the travel request, the actual, real-time vehicle emissions and fuel-efficiency data, the emissions credits obtained by the vehicle fleet, and the emission classification so as to mitigate an emissions footprint of the fleet and maximize the emissions credits obtained.

7. The computer-implemented method according to claim 6, wherein the assignment is made taking into account a vehicle efficiency and an emissions profile, in view of the travel request.

8. The computer-implemented method according to claim 6, further comprising assigning, by the computer, each vehicle of the vehicle fleet a function classification based on a primary function associated with the at least one personally owned vehicle.

9. The computer-implemented method according to claim 6, further comprising storing and indexing, by the computer, a function classification associated with the at least one personally owned vehicle, wherein the assignment is further based on the function classification.

10. The computer-implemented method according to claim 6, wherein the owner is compensated for depositing the at least one personally owned vehicle.

11. The computer-implemented method according to claim 6, wherein the owner is compensated via discounted purchase or lease terms for acquisition of the at least one personally owned vehicle.

12. The computer-implemented method according to claim 6, wherein the owner is compensated based on at least one of vehicle efficiency, emissions profile, and predetermined duration.

13. The computer-implemented method according to any of claim 12, wherein the compensation is inversely proportional to the emissions profile and/or directly proportional to the vehicle efficiency.

14. The computer-implemented method according to claim 6, wherein the traveler is required to deposit a personally owned vehicle for use in the vehicle fleet as a condition of using another fleet vehicle.

15. The computer-implemented method according to claim 6, wherein the personally owned vehicle is fractionally owned by 2 or more individuals and each of the 2 or more individuals are compensated according to their share of the fractional ownership.

16. A computer program product comprising instructions stored on computer readable medium which when implemented by a processor provide a computer system for managing a vehicle fleet, the computer system comprising:
   a deposit module for storing a record of a deposit from an owner of at least one personally owned vehicle for use in the vehicle fleet, the deposit being of a predetermined duration;
   a classification module configured to assign each vehicle of the vehicle fleet an emission classification based on at least one of vehicle capacity, efficiency, and exhaust emission level, the exhaust emissions level comprising a first level of $CO_2$ and a second level of NOx emissions, and to store and index the assigned classification;

a tracking module, implemented by the processor, configured to track actual, real-time vehicle emissions and fuel-efficiency data, and emissions credits obtained by the vehicle fleet based on excess emissions capacity provided by the vehicle fleet;

a request module configured to receive and process a travel request from a traveler other than the owner; and a determination module configured to determine and assign a personally owned vehicle from the vehicle fleet for use by the traveler during at least a portion of the predetermined duration based on the travel request, the actual, real-time vehicle emissions and fuel-efficiency data, the emissions credits obtained by the vehicle fleet, and the emissions classification so as to mitigate an emissions footprint of the fleet and maximize the obtained emissions credits.

17. The computer program product of claim 16, the system being configured for coordination among a plurality of vehicle fleets.

18. The computer program product of claim 16, wherein the travel request indicates at least a destination or a distance of travel.

19. The computer program product according to claim 16, wherein the travel request indicates a reason for travel.

* * * * *